US012789804B2

(12) United States Patent
Benaziz et al.

(10) Patent No.: US 12,789,804 B2
(45) Date of Patent: Nov. 10, 2026

(54) METHOD FOR MANAGING THE LONGITUDINAL SPEED OF AN AUTOMOTIVE VEHICLE

(71) Applicant: AMPERE S.A.S., Boulogne Billancourt (FR)

(72) Inventors: Marouane Benaziz, Cesson-Sevigné (FR); Pedro Kvieska, Guyancourt cedex (FR); Sebastien Saliou, Rennes (FR); Antoine Simonin, Guyancourt cedex (FR)

(73) Assignee: AMPERE S.A.S., Boulogne Billancourt (FR)

( * ) Notice: Subject to any disclaimer, the term of this patent is extended or adjusted under 35 U.S.C. 154(b) by 0 days.

(21) Appl. No.: 18/874,853

(22) PCT Filed: Jun. 15, 2022

(86) PCT No.: PCT/EP2022/066396
§ 371 (c)(1),
(2) Date: Dec. 13, 2024

(87) PCT Pub. No.: WO2023/241797
PCT Pub. Date: Dec. 21, 2023

(65) Prior Publication Data

US 2025/0368200 A1 Dec. 4, 2025

(51) Int. Cl.
*B60W 30/14* (2006.01)
*B60W 50/00* (2006.01)
*B60W 50/14* (2020.01)

(52) U.S. Cl.
CPC ...... *B60W 30/146* (2013.01); *B60W 50/0098* (2013.01); *B60W 50/14* (2013.01); *B60W 2050/0054* (2013.01); *B60W 2520/105* (2013.01); *B60W 2540/215* (2020.02); *B60W 2555/60* (2020.02); *B60W 2556/25* (2020.02);
(Continued)

(58) Field of Classification Search
CPC .. B60W 30/146; B60W 30/16; B60W 40/076; B60W 30/14; A61B 5/165
See application file for complete search history.

(56) References Cited

U.S. PATENT DOCUMENTS 8,005,602 B2 * 8/2011 Bando .................. B60W 30/16 340/467
2016/0121898 A1 5/2016 Jo et al.
(Continued)

FOREIGN PATENT DOCUMENTS

DE 10 2014 215 673 A1 2/2016

OTHER PUBLICATIONS

International Search Report issued Feb. 20, 2023 in PCT/EP2022/066396, filed on Jun. 15, 2022, 2 pages.

*Primary Examiner* — Yuri Kan
(74) *Attorney, Agent, or Firm* — Oblon, McClelland, Maier & Neustadt, L.L.P.

(57) ABSTRACT

A method for managing the longitudinal speed of a motor vehicle, the motor vehicle traveling on a planned trajectory, the motor vehicle being equipped with at least one detection means for detecting the environment of the vehicle and with an odometry means, wherein the method comprises detecting, based on data from the at least one detection means, a speed change point located on the given trajectory and ahead of the motor vehicle, and determining a limit speed applicable at the speed change point.

8 Claims, 3 Drawing Sheets

(52) U.S. Cl.
CPC ... *B60W 2556/50* (2020.02); *B60W 2720/106* (2013.01)

(56) References Cited

U.S. PATENT DOCUMENTS

| | | | | |
|---|---|---|---|---|
| 2017/0120892 | A1 | 5/2017 | Kato et al. | |
| 2022/0266691 | A1* | 8/2022 | Laitsaari | A61B 5/165 |
| 2023/0041499 | A1* | 2/2023 | Uestuenel | B60W 40/076 |

* cited by examiner

METHOD FOR MANAGING THE LONGITUDINAL SPEED OF AN AUTOMOTIVE VEHICLE

The invention relates to a method for managing the longitudinal speed of a motor vehicle. The invention furthermore relates to a device for managing the longitudinal speed of a motor vehicle. The invention also relates to a computer program implementing the mentioned method. The invention relates lastly to a recording medium on which such a program is recorded.

Automated speed management systems are commonly installed in modern vehicles, and are in the process of evolving so as to integrate new functionalities.

One evolution relates to the automated management of a change of speed at a precise position, for example stopping of the motor vehicle at a road sign, such as a stop sign, or at a traffic light. This functionality requires precisely following the temporal evolution of the position of the vehicle in relation to the speed change position, for example in relation to the position of the road sign. In addition, this functionality has to implement a speed profile that complies with driving comfort criteria, relating to in particular the application of maximum acceleration and jerk thresholds.

Document FR1913267 discloses a method for achieving servo-control of the longitudinal position of the vehicle with respect to time, thus making it possible to servo-control the time when the vehicle passes over a precise location of the road. However, this solution exhibits drawbacks. In particular, it does not make it possible to guarantee compliance with driving comfort criteria relating to the application of maximum acceleration and jerk thresholds. When the vehicle is supposed to stop at a precise location, it is observed, with existing systems, that the positioning of the vehicle is not always correct. For example, the vehicle may stop too far before a stop line and have to accelerate again or interrupt its braking in order to reach this stop line. On the contrary, the vehicle may generate sudden braking that is unpleasant for the passengers if a stop line is about to be crossed.

Document U.S. Pat. No. 8,924,049B2 also discloses a method defining a speed profile as a function of various parameters of the path, including a limit speed associated with each of the segments of the path. This method makes it possible to regulate the speed of the vehicle in relation to a speed limit determined by its position. However, this solution also exhibits and drawbacks, its precision and reliability may in particular be improved.

The aim of the invention is to provide a method for managing the longitudinal speed of a motor vehicle that overcomes the above drawbacks and improves the methods for managing the longitudinal speed of a motor vehicle that are known from the prior art. In particular, the invention makes it possible to implement a method that is simple and reliable and that makes it possible to implement a comfortable speed profile and to apply a speed change at a precise position.

To this end, the invention relates to a method for managing the longitudinal speed of a motor vehicle, the motor vehicle traveling on a planned trajectory, the motor vehicle being equipped with at least one detection means for detecting the environment of the vehicle and with an odometry means.

The method comprises the following steps:

- a step of detecting, based on data from the at least one detection means, a speed change point located on the given trajectory and ahead of the motor vehicle, and of determining a limit speed applicable at the speed change point, and then
- a second step of computing a first speed setpoint for the motor vehicle, as a function of the limit speed and of a first distance separating the motor vehicle from the speed change point, the first distance being computed as a function of a planned speed profile, the first distance having a distance margin of error with respect to a second distance determined by the odometry means between the motor vehicle and the speed change point, and then
- a third step comprising determining a second speed setpoint that compensates for the distance margin of error generated in the second step and that anticipates a phase delay generated in a fourth step of controlling the movement of the motor vehicle, and then
- a fourth step of controlling the movement of the motor vehicle in accordance with the second speed setpoint so as to reach the speed change point with a speed equal to the limit speed, the fourth step generating the phase delay between the reception of the second speed setpoint and the movement of the vehicle in accordance with the second speed setpoint.

The motor vehicle may be equipped with a measuring means for measuring the instantaneous speed of the vehicle, and the fourth step may comprise determining an acceleration setpoint for the motor vehicle as being the sum of a first and a second acceleration component.

The first acceleration component may be computed by applying a first-degree differential filter to the second speed setpoint.

The second acceleration component may be obtained by applying a first proportional gain controller to the difference between an instantaneous speed of the vehicle determined by the speed measuring means and a filtered speed setpoint.

The filtered speed setpoint may be obtained by successively applying a first and a second first-order filter to the second speed setpoint.

The first filter may apply a phase delay to the second speed setpoint so as to synchronize the second speed setpoint with the first acceleration component, and the second filter may be parameterized such that the filtered speed setpoint converges on a stable value.

The second speed setpoint is the sum of a first and a second speed component.

The first speed component may be obtained by applying a first and a second phase advance filter to the first speed setpoint, and the second speed component may be obtained by applying a second proportional controller comprising a given gain to the distance margin of error, the given gain being regulated so that the second speed component converges on a stable value.

The same time constant may be used to define the first phase advance filter applied to compute the second speed setpoint, the first-degree differential filter and the first phase delay filter applied to compute the acceleration setpoint.

The same time constant may be used to define the second phase advance filter applied to compute the second speed setpoint, and the second phase delay filter applied to compute the acceleration setpoint.

The vehicle may comprise a human-machine interface allowing a user to define a fourth speed setpoint and the third step may comprise modifying the second speed setpoint as being the minimum out of the second speed setpoint and the fourth speed setpoint.

The vehicle may comprise a target following module that determines a third speed setpoint and the third step may comprise modifying the second speed setpoint as being the minimum out of the second speed setpoint, the third speed setpoint and the fourth speed setpoint.

The limit speed may be zero.

The invention furthermore relates to a device for managing the longitudinal speed of a motor vehicle, the vehicle being equipped with a torque controller.

The invention also relates to a computer program product comprising program code instructions recorded on computer-readable medium for implementing the steps of the method as defined above when said program runs on a computer. The invention also relates to a computer program product able to be downloaded from communication network and/or recorded on a computer-readable and/or computer-executable data medium, comprising instructions that, when the program is executed by computer, the cause said computer to implement the method as defined above.

The invention furthermore relates to a computer-readable data recording medium on which there is recorded a computer program comprising program code instructions for implementing the method as defined above. The invention also relates to a computer-readable recording medium comprising instructions that, when they are executed by a computer, cause said computer to implement the method as defined above.

The invention furthermore relates to a signal of a data medium carrying the computer program product as defined above.

The appended drawing shows, by way of example, one embodiment of a device for managing the longitudinal speed of a motor vehicle according to the invention and one mode of execution of a method for managing the longitudinal speed of a motor vehicle according to the invention.

Figure 3:
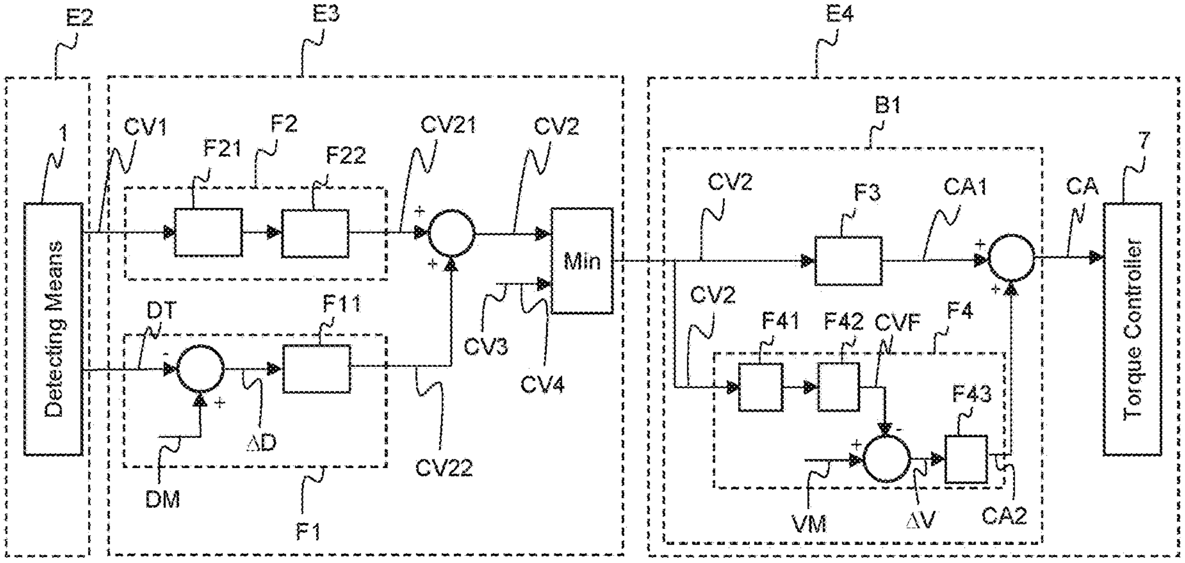

FIG. 3 schematically shows the processing operations carried out in steps E2 to E4 of the method for managing the longitudinal speed of a motor vehicle.

Figure 4:
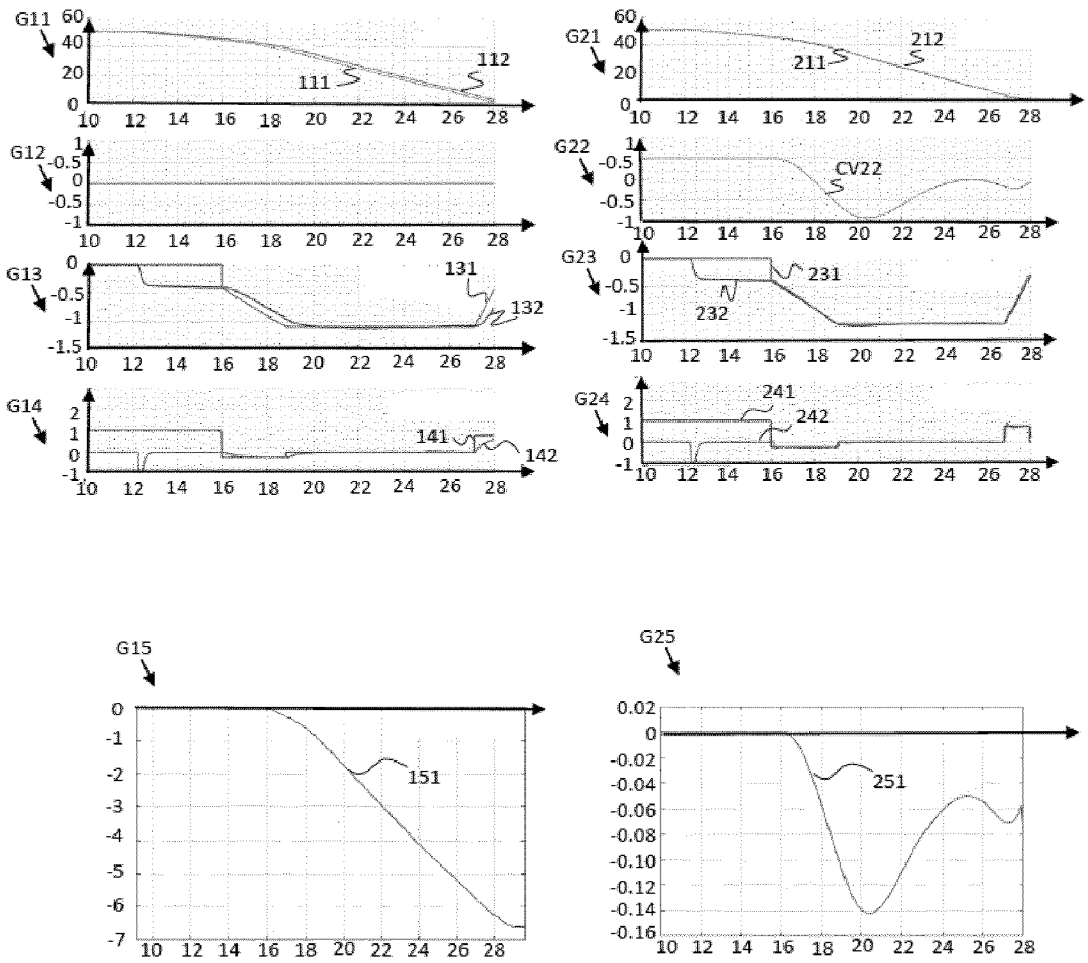

FIG. 4 illustrates the effect of implementing the method for managing the longitudinal speed of a motor vehicle.

Figure 1:
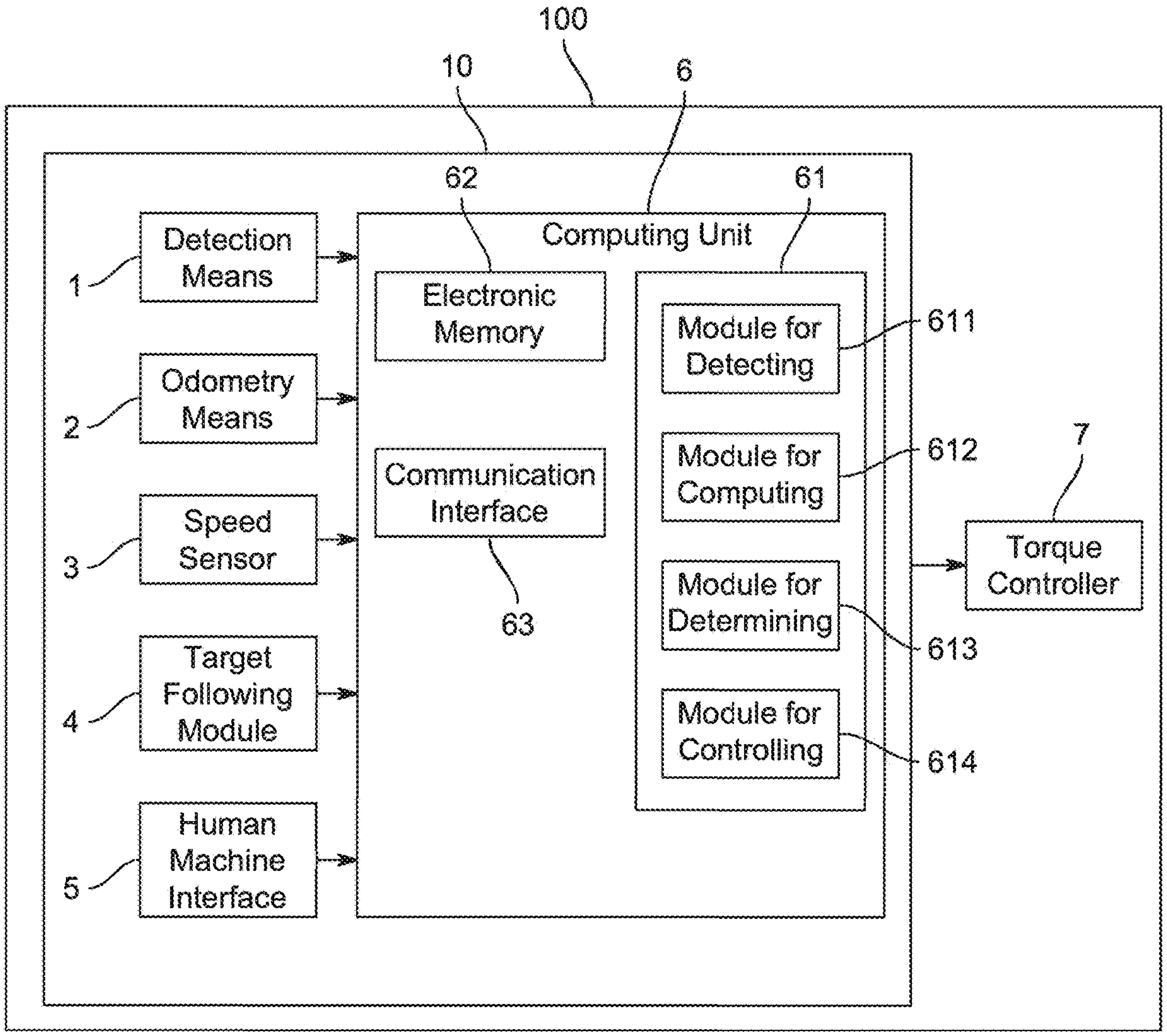
FIG. 1 shows a motor vehicle equipped with a device for managing the longitudinal speed of a motor vehicle.

One example of a motor vehicle 100 equipped with one embodiment of a device for managing the longitudinal speed of an autonomous vehicle is described below with reference to FIG. 1.

The motor vehicle 100 may be a motor vehicle of any type, in particular a passenger vehicle, a utility vehicle, a truck or else a public transport vehicle such as a bus or a shuttle bus. According to the embodiment described, the motor vehicle 100 is an autonomous vehicle and will be designated “autonomous vehicle” in the remainder of the description.

This illustration is therefore given so as to be non-limiting. In particular, the motor vehicle could be a non-autonomous vehicle, equipped with a driving assistance system, in particular a driving assistance system corresponding to a level higher than or equal to autonomy level 2, that is to say corresponding to partial autonomy of the vehicle.

It will be assumed that the autonomous vehicle 100 is moving on a planned trajectory T passing through a speed change point P located ahead of the autonomous vehicle.

In the remainder of the document, the term “speed change point” is used to designate an element of the road infrastructure that determines a limit speed at the position of this road infrastructure element, or based on the position of this road infrastructure element. Depending on the type of speed change point, the limit speed may be a maximum speed. This is the case for example if the speed change point is a speed limit sign, or a give way sign.

The speed change point may also be a signpost (for example a stop sign) or a traffic light able to order the autonomous vehicle to stop at the speed change point.

If there are multiple signposts or traffic lights on the route in question, the speed change point is the one that the autonomous vehicle will reach first.

The device managing speed for longitudinal more particularly concerns speed change points that involve a speed reduction, or even stopping of the autonomous vehicle. Indeed, in the case of a speed change point involving a speed reduction or more particularly stopping, compliance with the position of the speed change point may be essential. In one embodiment, the device for managing longitudinal speed could take into account only speed change points involving stopping of the autonomous vehicle, or a speed reduction to below a given threshold.

The term “speed change position” designates the position of the speed change point.

The autonomous vehicle 100 comprises a management system 10 and a torque controller 7. The torque controller 7 receives acceleration setpoints generated by the management system 10. In order to implement a longitudinal movement of the autonomous vehicle 100, the torque controller 7 transforms each acceleration setpoint into a first torque setpoint intended for a drivetrain of the vehicle and/or a second torque setpoint intended for a brake actuator of the vehicle.

The management system 10 primarily comprises the following elements:

- at least one detection means 1,
- an odometry means 2,
- a measuring means for measuring the instantaneous speed of the autonomous vehicle 3, or speed sensor 3,
- a target following module 4,
- a human-machine interface 5,
- and a computing unit 6 comprising a microprocessor 61, an electronic memory 62 and communication interfaces 63 allowing the microprocessor 61 to communicate with the detection means 1, the odometry means 2, the measuring means for measuring instantaneous speed 3, the target following module 4 and the human-machine interface 5.

The detection means 1 may comprise a GPS localization means for localizing the autonomous vehicle 100 on a standard-definition map, or on a high-definition map. In this embodiment, the range of the detection means 1 is of the order of several hundred meters and its precision is determined by the precision of the GPS localization, which is of the order of a few meters.

Based on the map and the data from the GPS, the detection means 1 is able to detect a speed change point located on the planned trajectory T of the autonomous vehicle 100, based on a current position of the autonomous vehicle 100. The data from the detection means 1 thus make it possible to determine the speed change position.

Advantageously, the detection means 1 may furthermore comprise an equipment the precision of which is greater than that of the GPS localization. This equipment may be for example a front camera and/or a lidar. In this embodiment, the images from the front camera and/or from the lidar make it possible to detect the speed change position with a precision of the order of around ten centimeters.

The odometry means 2 evaluates a distance DP traveled by the vehicle from a given point, for example from a starting point of a route. In one embodiment, the distance traveled DP may be obtained by integrating the speed of the autonomous vehicle 100, In one alternative embodiment, the odometry means 2 could comprise a high-precision positioning means for positioning the autonomous vehicle on a m map, for example using a GPS sensor; based on the positioning of the vehicle, the odometry means could compute the distance traveled DP.

The distance traveled DP is then used to estimate the curvilinear distance DM separating the autonomous vehicle 100 from the speed change point P.

The speed sensor 3 provides the instantaneous speed of the autonomous vehicle 100 at all times. The speed sensor 3 may comprise for example sensors for sensing the rotation of the wheels of the autonomous vehicle 100.

The management system 10 determines a first and a second speed setpoint CV1, CV2, which will be described later on in this document.

The target following module 4 determines a third speed setpoint CV3 that makes it possible to maintain a following distance between the autonomous vehicle 100 and one or more nearby vehicles. In one preferred embodiment, the at least one target is detected in traffic located ahead of the autonomous vehicle 100. In this embodiment, the at least one target may be located in the lane of the autonomous vehicle, for example the at least one target may comprise a first vehicle located ahead of the autonomous vehicle and in its lane, and a second vehicle located ahead of the first target vehicle and in the same lane. In addition, when the autonomous vehicle is traveling on a road with multiple lanes with the same direction of travel, the at least one target may also comprise one or more vehicles that exhibit a risk of cutting into the lane of the autonomous vehicle 100. Vehicles at risk of cutting in are detected in the one or more lanes adjacent to the lane of the autonomous vehicle 100 in the traffic located ahead of the autonomous vehicle 100. They are located ahead of the this autonomous vehicle 100, possibly including situations in which a vehicle is carrying out a maneuver of overtaking the autonomous vehicle 100 or vice versa. In other words, a vehicle may be detected as being at risk of cutting in when it is driving in parallel with the autonomous vehicle 100. When no target is detected in the environment of the autonomous vehicle 100, the third speed setpoint CV3 is undefined.

The human-machine interface 5 allows a user of the autonomous vehicle 100 to determine a fourth speed setpoint CV4. The human-machine interface 5 may for example be an input screen present on the dashboard of the autonomous vehicle 100. In one preferred embodiment (described in the remainder of the document), the fourth speed setpoint CV4 is always defined. In one alternative embodiment that is not described, the fourth speed setpoint might not be defined.

In one embodiment, the microprocessor 61 makes it possible to execute software comprising the following modules, which collaborate with one another:

- a module 611 for detecting a speed change point and determining a limit speed applicable at the speed change point, which collaborates with the at least one detection means 1;
- a module 612 for computing a first speed setpoint CV1,
- a module 613 for determining a second speed setpoint CV2, which collaborates with the odometry means 2, the target following module 4 and the human-machine interface 5, the determination of the second speed setpoint CV2 taking into account the second and third speed setpoints CV3, CV4 in accordance with an arbitration strategy that is described later on in this document,
- a module 614 for controlling the movement of the autonomous vehicle in accordance with the second speed setpoint CV2, which collaborates with the speed sensor 3.

Figure 2:
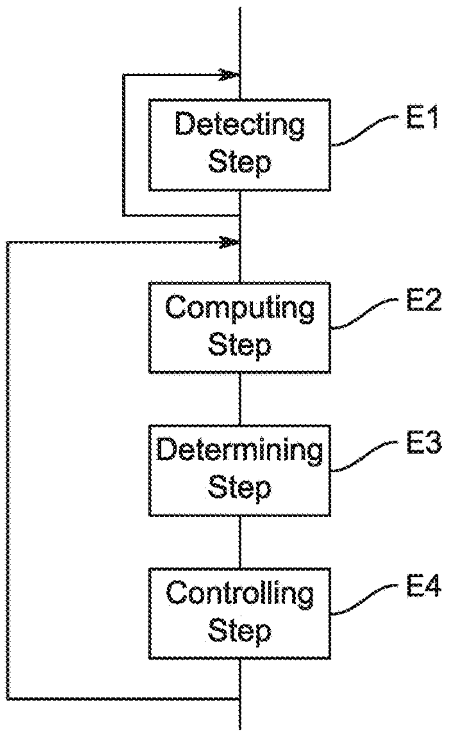
FIG. 2 is a flowchart of one mode of execution of a method for managing the longitudinal speed of a motor vehicle.

One mode of execution of the method for managing the speed of an autonomous vehicle is described below with reference to FIG. 2. The method comprises four steps E1 to E4.

Step E1 comprises detecting, based on data from the at least one detection means 1, a speed change point P located on the planned trajectory T of the autonomous vehicle 100 and ahead of the autonomous vehicle, and determining a limit speed VL applicable at the speed change point P.

For this purpose, the data from the one or more detection means 1 are compared with the planned trajectory T.

For example, in one embodiment in which the detection means 1 is implemented by carrying out GPS localization of the autonomous vehicle on a map, the trajectory planning information, vehicle position information and map information is combined in order to search for the presence of a speed change point P on the route portion located ahead of the autonomous vehicle 100 and within range of the first detection means 1.

At a time T0, at least one speed limit sign or stop sign is thus detected on this route portion. If multiple signs are detected on this route portion, the sign closest to the autonomous vehicle 100 will be detected as being the speed change point P.

The map data make it possible to associate a limit speed VL with the speed change point P. For example, if the speed change point P is determined by a speed limit sign, the speed VL is the speed depicted on the speed limit sign. A speed change point may also be determined by a change of type of lane, for example the end of a fast lane segment or of a motorway segment, which leads onto a different type of lane, for example a national or regional road segment. The speed VL is then determined by the rule defined on said different type of lane. A speed change point P may also be determined by a stop sign and, in this case, the limit speed VL is zero. In other situations in which the speed change point P corresponds to a crossroads on which the autonomous vehicle 100 does not have right of way, for example a roundabout or a crossroads with traffic lights, the speed VL may be close to zero.

Next, following step E1, an iteration is carried out over steps E2 to E4 until the autonomous vehicle 100 reaches the speed change point P.

Steps E2 to E4 are described below with reference to FIG. 3.

The second step E2 comprises computing a first speed setpoint CV1 for the autonomous vehicle 100, as a function of the limit speed VL and of a first distance DT, planned as a function of time, separating the autonomous vehicle 100 from the speed change point P.

The first distance DT is a theoretical distance, that is to say it will be computed in each iteration of step E2 as a function of a predictive speed profile PVP that is described below. In the remainder of the document, the first distance DT is called “theoretical distance DT”.

In the first iteration of step E2, that is to say at the time T0, the theoretical distance DT is equal to the initial curvilinear distance D0 computed between the position of the autonomous vehicle 100 at the time T0 and the position of the speed change point P.

The first iteration of step E2 comprises computing a predictive speed profile PVP over the route portion linking the position, at the time T0, of the autonomous vehicle 100 to the position of the speed change point P.

In the remainder of the document, the term "speed profile" designates curves of the temporal evolution of the longitudinal speed, of the longitudinal acceleration and of the longitudinal jerk of the autonomous vehicle 100, the longitudinal jerk being the derivative of the longitudinal acceleration of the autonomous vehicle 100.

The predictive speed profile PVP is computed such that the autonomous vehicle 100 is traveling at the speed VL when it reaches the speed change point P.

Furthermore, the predictive speed profile PVP is computed so as to allow the autonomous vehicle 100 to move on the route T, between its position at the time T0 and the speed change point P, and in accordance with comfort criteria required for users of the vehicle. The comfort criteria may compliance comprise with maximum acceleration and jerk thresholds.

Thus, at the time T0, the predictive speed profile PVP of the autonomous vehicle 100 is determined based on its position at the time T0 and until it arrives at the speed change point P. In particular, the speed profile comprises a curve of the theoretical temporal evolution VT(t) of the autonomous vehicle 100.

In the following iterations of step E2, it is considered that the autonomous vehicle 100 is moving in accordance with the predictive speed profile PVP established at the time T0. It is therefore possible, at each time t of iteration over step E2, to compute

- a first speed setpoint CV1=VT(t), and
- a theoretical distance DT(t) between the autonomous vehicle and the speed change point P, DT(t) evolving in accordance with a curve that decreases between the value D0 at T0 and the value 0 at the time of arrival at the speed change point P.

The theoretical distance DT(t) between the autonomous vehicle and the speed change point P is computed in accordance with the following formula:

$$DT(t) = D0 - DPT(t) \quad \text{[Math 1]}$$

where

- D0 is the distance computed at the time T0 between the autonomous vehicle 100 and the speed change point P,
- DPT(t) is the distance that has been theoretically traveled by the autonomous vehicle 100 moving in accordance with the predictive speed profile PVP between the times T0 and t.

Since the first distance DT thus computed is theoretical, it has a distance margin of error ΔD with respect to a second distance DM determined by the odometry means 2 between the autonomous vehicle 100 and the speed change point P.

The method then moves to step E3. The third step E3 comprises determining a second speed setpoint CV2 that compensates for the distance margin of error ΔD generated in the second step E2 and that anticipates a delay ΔT generated in the fourth step E4 of controlling the movement of the autonomous vehicle 100.

Step E3 comprises determining, at the time t, an estimated distance DM(t) between the autonomous vehicle and the speed change point P, based on the data from the odometry means 2.

The odometry means 2 evaluates a distance DP(t) traveled by the vehicle between the time T0 of detection of the speed change point and the time t. In particular, the distance DP(t) may be obtained by integrating the speed of the autonomous vehicle 100 between the times T0 and t. The estimated distance DM(t) between the autonomous vehicle 100 and the speed change point P is then equal to the difference between the initial distance D0 and the distance traveled DP(t).

As an alternative, the distance DM(t) could be estimated based on images from a front camera, when the speed change point P enters the detection area of the front camera.

Step E3 furthermore comprises computing, at the time t, a second speed setpoint CV2(*t*) based on the first speed setpoint CV1(*t*) and on the difference between the theoretical distance DT(t) and the estimated distance DM(t).

The computing of the second speed setpoint CV2(*t*) is defined so as to compensate for two factors that lead to imprecision in the temporal evolution of the position of the autonomous vehicle 100 along its trajectory T:

- a first imprecision factor is related to a difference between the theoretical distance DT(t) computed in accordance with the formula Math 1 and the real distance separating the autonomous vehicle 100 from the speed change point P at the time t,
- a second imprecision factor is related to a phase delay ΔT caused by a servo loop between speed and acceleration, this loop being implemented in the following processing step, that is to say in step E4.

To compensate for these imprecision factors, step E3 comprises implementing two corrections F1 and F2 that respectively correct the first and the second imprecision factor,

- the first correction F1 is a distance regulation loop that takes the difference ΔD(t) between the theoretical distance DT(t) and the estimated distance DM(t) at input,
- the second correction F2 comprises two phase advance filters applied between the first speed setpoint CV1 and the second speed setpoint CV2.

The first correction F1 aims to correct the first speed setpoint CV1(*t*) in proportion with a measured distance difference ΔD(t) with respect to the predictive speed profile PVP. For this purpose, the first correction F1 applies a proportional controller F11 comprising a given gain $K_D$, in particular a multiplicative gain $K_D$, to the difference ΔD(t) between the theoretical distance DT(t) computed in accordance with the formula Math 1, and the estimated distance DM(t) between the autonomous vehicle and the speed change point P. The gain $K_D$ is consistent with the inverse of a second ($s^{-1}$); it makes it possible to regulate the dynamics of this correction. In one embodiment, it is determined empirically so as to satisfy a compromise between stability and precision of the following of a setpoint.

The second correction F2 aims to compensate for the delay ΔT related to the filters implemented in subsequent step E4, in particular in a servo loop B1 between the second speed setpoint CV2 and an acceleration setpoint CA. The second correction F2 is therefore determined by the embodiment of the servo loop B1 that will be described later on in this document. The second correction F2 will be described later on, following the description of the servo loop B1.

The second speed setpoint CV2 is thus the sum of a first and a second speed component CV21, CV22, the first speed component CV21 being obtained by applying two phase advance filters to the first speed setpoint CV1, and the second speed component CV22 being obtained by applying a gain $K_D$ to the distance margin of error ΔD.

It should be noted that the gain $K_D$ is regulated such that the second speed component CV22 converges on a stable value.

In one embodiment of step E3, step E3 may furthermore comprise processing a third speed setpoint CV3 determined by the target following module 4.

This situation occurs when step E1 is carried out at a time when no target is detected by the target following module 4, and then a target is detected during the implementation, in E2 to E4, of the regulation of the speed of the autonomous vehicle with respect to the distance of the vehicle to the speed change point P.

At the time when a target is detected, a third speed setpoint CV3 is computed by the target following module 4 so as to maintain a given following distance between the autonomous vehicle 100 and said target.

The target is preferably detected in traffic located ahead of the autonomous vehicle 100. In this case, the speed setpoint applied by the autonomous vehicle 100 must be lower than the speed setpoint CV3, so that the autonomous vehicle 100 complies with the given following distance with the target.

Therefore, for safety reasons, an arbitration strategy is applied between the two speed setpoints CV2 and CV3.

According to this strategy, the second speed setpoint CV2 must be limited to the third speed setpoint CV3.

In other words, the value of the second speed setpoint CV2 is updated as being the minimum out of the second speed setpoint CV2 and the third speed setpoint CV3.

In one alternative or additional embodiment of step E3, step E3 may furthermore comprise processing a fourth speed setpoint CV4 defined by the user of the vehicle via the human-machine interface.

An arbitration strategy is therefore applied between the two speed setpoints CV2 and CV4. According to this strategy, the second speed setpoint CV2 must be limited to the fourth speed setpoint CV4. If a third speed setpoint CV3 is defined, the second speed setpoint CV2 must also be limited to the third speed setpoint CV3.

In other words, the value of the second speed setpoint CV2 is updated as being the minimum out of the second speed setpoint CV2, the fourth speed setpoint CV4 and the third speed setpoint CV3, if the third setpoint CV3 is defined, otherwise the minimum out of the second speed setpoint CV2 and the fourth speed setpoint CV4.

The method then moves to step E4. One embodiment of step E4 shown by FIG. 2 comprises implementing a servo loop B1 between the second speed setpoint CV2 computed in step E3 and an acceleration setpoint CA.

For example, the servo loop B1 may implement speed regulation that generates two acceleration components CA1, CA2:

a first acceleration component CA1 of feedforward type is obtained by applying a first-order differential filter F3 to the second speed setpoint CV2, a second acceleration component CA2 of feedback type is obtained by applying a proportional gain controller F43 to a speed error ΔV, computed between a measured speed VM of the motor vehicle 100 and a filtered speed setpoint CVF, the acceleration setpoint CA being the sum of the first and second acceleration components CA1, CA2.

The proportional controller F43 applies a multiplicative gain $K_V$ to the speed error ΔV. The gain $K_V$ is consistent with the inverse of a second ($s^{-1}$); it makes it possible to regulate the dynamics of this correction. In one embodiment, it is determined empirically so as to satisfy a compromise between stability, speed and comfort with regard to following a setpoint. In particular, the gain $K_V$ is defined so that the second acceleration component CA2 converges on a stable value.

The filtered speed setpoint CVF is obtained by applying two successive first-order filters F41, F42 to the second speed setpoint CV2. The first filter F41 aims to synchronize the second speed setpoint CV2 with the first acceleration component CAL of feedforward type. The second filter F42 aims to take into account the dynamics of the system.

The respective transfer functions H3, H41, H42 of the filters F3, F41, F42 are expressed respectively in accordance with the formulas Math 2.

$$H3 = \frac{s}{1+\tau_{FF}s} \quad \text{[Math. 2]}$$
$$H41 = \frac{1}{1+\tau_{FF}s}$$
$$H42 = \frac{1}{1+\tau_{ModFF}s}$$

where s is the Laplace variable consistent with the inverse of a second ($s^{-1}$), $\tau_{FF}$ is a first time constant, the value of which is of the order of a few tenths of seconds, for example 0.4 seconds, and $\tau_{ModFF}$ is a second time constant, the value of which is of the order of around a tenth of a second, for example 0.15 seconds.

The relatively high value of the first time constant $\tau_{FF}$ has the benefit of filtering any sudden variations in the evolution of the speed setpoint, and thus of improving user comfort. Said sudden are due in variations particular to a discontinuity of the derivative of the temporal evolution of the speed setpoint.

Nevertheless, the high value of $\tau_{FF}$ leads to a non-negligible delay between the computing of the speed setpoint for the autonomous vehicle 100 and the implementation of this speed setpoint by the drivetrain and/or the brake actuator.

As has been explained above, step E3 comprises applying a second correction F2 so that the delay introduced by the loop B1 does not penalize the ability of the autonomous vehicle 100 to reach a precise point of its route at a given speed.

The second correction F2 comprises a first phase advance filter F21 that carries out compensation by anticipating the delay introduced by the filter F41, and a second phase advance filter F22 that carries out compensation by anticipating the delay introduced by the filter F42.

The respective transfer functions H21 and H22 of the filters F21 and F22 are respectively expressed in accordance with the formulas Math 3.

$$H21 = \frac{1+\tau_{FF}s}{1+\tau_{j}s} \quad \text{[Math 3]}$$

-continued $$H22 = \frac{1 + \tau_{ModFF}s}{1 + \tau_j s}$$

where s is the Laplace variable consistent with the inverse of a second ($s^{-1}$), $\tau_{FF}$ is the first time constant, also used in the phase delay filter F41, $\tau_{ModFF}$ is the second time constant, also used in the phase delay filter F42, If is a third time constant the value of which is of the order of 50 milliseconds.

Since the filters F21 and F22 are thus defined, the phase delay between the first speed setpoint CV1 and the acceleration setpoint CA is limited to the delay caused by the third time constant. This delay is therefore minimized, since it is of the order of 50 milliseconds.

The acceleration setpoint CA thus determined is transmitted to the torque controller 7 in order to implement a longitudinal movement of the autonomous vehicle 100.

FIG. 4 illustrates the effect of implementing the invention:

the graphs G11, G12, G13, G14 and G15 illustrate the movement of the autonomous vehicle toward a speed change point P without the invention being implemented, and the graphs G21, G22, G23, G24 and G25 illustrate the movement of the autonomous vehicle toward a speed change point P with the invention being implemented.

The x-axis of the graphs G11 to G15 and of the graphs G21 to G25 represents time in seconds.

The graphs G11 and G21 make it possible to compare the temporal evolution of the speed (shown in km/h on the y-axis of the graphs G11 and G21) of the autonomous vehicle respectively without and with the invention being implemented:

on the graph G11, without the invention being implemented, the applied speed 112 lags the speed setpoint 111 from the predictive speed profile PVP, on the graph G21, with the invention being implemented, the applied speed 212 is substantially closer to the speed setpoint 211 from the predictive speed profile PVP.

The graphs G12 and G22 make it possible to compare the temporal evolution of a component of the speed setpoint (shown in m/s on the y-axis of the graphs G12 and G22) corresponding to a distance correction respectively without and with the invention being implemented:

on the graph G12, this component is zero since, without the invention being implemented, no speed correction is applied, on the graph G22, with the invention being implemented, this component CV22 changes between 0 m/s and −0.15 m/s.

The graphs G13 and G23 make it possible to compare the temporal evolution of the acceleration of the autonomous vehicle (shown in $m/s^2$ on the y-axis of the graphs G13 and G23) respectively without and with the invention being implemented:

on the graph G13, without the invention being implemented, between the times t=16 s and t=28 s, it is possible to see a significant difference between the acceleration 132 applied by the vehicle and the acceleration setpoint 131 from the predictive speed profile PVP, on the graph G23, with the invention being implemented, between the times t=16 s and t=28 s, it is possible to see a reduction in the difference between the acceleration 232 applied by the vehicle and the acceleration setpoint 231 from the predictive speed profile PVP.

Likewise, the graphs G14 and G24 make it possible to compare the temporal evolution of the jerk of the autonomous vehicle (shown in $m/s^3$ on the y-axis of the graphs G14 and G24) respectively without and with the invention being implemented:

on the graph G14, without the invention being implemented, at the time t=28 s, it is possible to see a significant difference between the jerk 142 applied by the vehicle and the jerk 141 determined by the predictive speed profile PVP, on the graph G24, with the invention being implemented, the difference observed at the time t=28 s between the jerk 242 applied by the vehicle and the jerk 241 determined by the predictive speed profile PVP is considerably reduced.

In addition, the graphs G15 and G25 make it possible to compare the temporal evolution, respectively without and with the invention being implemented, of a distance error (shown in meters on the y-axis of the graphs G15 and G25) measured at a given time between the real position of the autonomous vehicle and the theoretical position determined by the predictive speed profile PVP:

on the graph G15, without the invention being implemented, the distance error 151 increases significantly over time until it exceeds 6 meters, on the graph G25, with the invention being implemented, the distance error remains than fifteen 251 less entire duration of the path and centimeters over the stabilizes around 6 centimeters when approaching the speed change point P.

By virtue of the invention, the speeds, accelerations and jerks implemented by the autonomous vehicle 100 remain close to the values defined by the predictive speed profile PVP during the movement of the vehicle toward the speed change point P. The phase and distance corrections provided by the invention allow the autonomous vehicle 100, first of all, to move along its route while minimizing the distance between its real position and a theoretical position determined by a movement in accordance with its profile PSP, and thus in particular to ensure comfort for the users of the vehicle and, second of all, to reach the speed change point P with a speed close to the limit speed VL, and with a precision of the order of around ten or a few tens of centimeters in relation to the position of the speed change point P, and thus to ensure stopping precision or speed change precision.

One particular feature of the invention is that of regulating not only the speed of the autonomous vehicle with respect to time but also the distance between the autonomous vehicle and the speed change point with respect to time. Thus, regulating the distance between the autonomous vehicle and the speed change point makes it possible to correct any position deviation related to a deviation of the speed of the vehicle from the setpoint. This point in particular distinguishes the invention from U.S. Pat. No. 8,924,049B2 cited in the prior art.

Furthermore, a strategy of switching between regulating the speed of the autonomous vehicle according to the invention and regulating the speed of the autonomous vehicle in accordance with the target following module 4 is applied. Indeed, the requirements in terms of precision of the speed regulation are highly different depending on whether it is sought to maintain a following distance between a target vehicle and the autonomous vehicle 100, or whether it is sought to precisely reach a speed change position of the autonomous vehicle, in particular a stopping position of the autonomous vehicle. In the case of target following, the speed of the autonomous vehicle is regulated with respect to the speed of the target so as to maintain a following distance corresponding to a minimum time, for example 2 seconds, separating the two vehicles. For example, if it is considered that the vehicle is traveling at 90 km/h, a following distance equivalent to 2 seconds of separation is 50 meters. The distance actually maintained between the autonomous vehicle and the target may then oscillate between 45 and 55 meters without this having any effect on safety. By contrast, in the case of speed regulation as a function of a speed change position of the autonomous vehicle, and more particularly as a function of a stopping position of the autonomous vehicle, the expected precision regarding the position of the vehicle in relation to the speed change point P is of the order of around ten centimeters. Likewise, the following speed for a target may oscillate slightly around a following speed setpoint without this affecting compliance with a safety distance between the two vehicles. By contrast, in the case of speed regulation as a function of a stopping position of the autonomous vehicle, it is not acceptable for the speed of the vehicle to oscillate around 0 m/s when reaching the stopping point, since such oscillations signify that the vehicle is moving forward and backward when it arrives at the stopping point.

In other words, the positional and speed precision provided by the invention is highly advantageous if it is desired for the autonomous vehicle to stop at a precise point (for example in front of a stop sign), but such precision is not required for target following.

On the contrary, the regulation according to the invention may generate discomfort if it is applied to a speed profile generated by the target following module 4. Indeed, a speed profile generated by the target following module may have a discontinuous derivative, the discontinuities of which are filtered by applying filters the effect of which would be canceled out by implementing the invention. In other words, if a speed regulation according to the invention were to be applied to a speed profile generated by the target following module, this would degrade the comfort of following a target, in particular the speed of the vehicle would be jerky.

The switching strategy therefore consists in implementing the speed controller best suited to the current situation, the situation possibly being that of following a target or changing speed at a precise position:

- in the case of a speed regulation with respect to a speed change at a precise position, the speed regulation will comprise applying corrective filters (in step E3) upstream of a servo loop B1 between speed and acceleration (implemented in step E4),
- in the case of a speed regulation with respect to following a target, the speed regulation will comprise only the servo loop B1 between speed and acceleration (implemented in step E4).

Moreover, situations in which a target appears while a speed regulation according to the invention is in progress are also dealt with. In this case, a speed setpoint is determined by the target following module 4 while a speed regulation in accordance with a predictive speed profile is in progress. An arbitration strategy is then applied; this consists in determining the speed setpoint as being the minimum out of the second speed setpoint CV2 from the predictive speed profile and the third speed setpoint CV3 from the following module 4. It is thus ensured in all cases that the target following distance is complied with; if the second speed setpoint CV2 is lower than the target following speed setpoint, the speed regulation according to the invention, that is to say the speed regulation with respect to a speed change point, is maintained.

More generally, the arbitration strategy implemented in the invention consists in determining the speed setpoint as being the minimum out of the various defined speed setpoints, the setpoint CV4 from the human-machine interface 5, any setpoint CV3 from the target following module 4, and the speed setpoint CV2 from the predictive speed profile. This thus ensures that the speed setpoint applied to the autonomous vehicle does not exceed the speed defined by the user and makes it possible to comply with a minimum distance for following any target.

The invention claimed is:

1. A method for managing a speed of a motor vehicle, the motor vehicle traveling on a planned trajectory, the method comprising:

- detecting a speed change point located on the planned trajectory and ahead of the motor vehicle, and determining a limit speed applicable at the speed change point,
- computing a first speed setpoint for the motor vehicle, as a function of the determined limit speed and of a first distance separating the motor vehicle from the speed change point, the first distance being computed as a function of a planned speed profile, the first distance having a distance margin of error with respect to a second distance between the motor vehicle and the speed change point,
- determining a second speed setpoint that compensates for the distance margin of error and that anticipates a phase delay generated in a controlling step of controlling a movement of the motor vehicle, and
- the controlling step of controlling the movement of the motor vehicle in accordance with second speed setpoint so as to reach speed change point with a speed equal to the limit speed, wherein the controlling step includes generating the phase delay between reception of the second speed setpoint and movement of the motor vehicle in accordance with the second speed setpoint.

2. The management method as claimed in claim 1, for further comprising measuring an instantaneous speed of the motor vehicle,

- wherein the controlling step further comprises determining an acceleration setpoint for the motor vehicle as a sum of a first acceleration component and a second acceleration component,
- the first acceleration component is computed by applying a first-degree differential filter to the second speed setpoint,
- the second acceleration component is obtained by applying a first proportional gain controller to a difference between the instantaneous speed of the motor vehicle and a filtered speed setpoint,
- the filtered speed setpoint is obtained by successively applying a first first-order filter and a second first-order filter to the second speed setpoint,
- the first first-order filter applies a phase delay to the second speed setpoint so as to synchronize the second speed setpoint with the first acceleration component, and
- the second first-order filter is parameterized such that the filtered speed setpoint converges on a first stable value.

3. The management method as claimed in claim 2, wherein the second speed setpoint is a sum of a first speed component and a second speed component, the first speed component is obtained by applying a first phase advance filter and a second phase advance filter to the first speed setpoint, and the second speed component is obtained by applying a second proportional controller comprising a given gain to the distance margin of error, the given gain being regulated so that the second speed component converges on a second stable value.

4. The management method as claimed in claim 3, wherein:

a same time constant is used to define the first phase advance filter applied to compute the second speed setpoint, the first-degree differential filter and the first first-order filter are applied to compute the acceleration setpoint, and a same time constant is used to define the second phase advance filter applied to compute the second speed setpoint, and the second first-order filter is applied to compute the acceleration setpoint.

5. The management method as claimed in claim 1, wherein the motor vehicle further comprises a human-machine interface allowing a user to define a fourth speed setpoint, wherein the determining step further comprises modifying the second speed setpoint to be a minimum out of the second speed setpoint and the fourth speed setpoint.

6. The management method as claimed in claim 5, further comprising determining a third speed setpoint, and wherein the determining step further comprises modifying the second speed setpoint to be a minimum out of the second speed setpoint, the third speed setpoint, and the fourth speed setpoint.

7. The management method as claimed in claim 1, wherein the limit speed is zero.

8. A computer program product comprising program code instructions recorded on a non-transitory computer-readable medium for implementing the steps of the method as claimed in claim 1, when said program code runs on a computer.

* * * * *